(12) United States Patent
Kabalnov et al.

(10) Patent No.: US 7,695,555 B2
(45) Date of Patent: Apr. 13, 2010

(54) PIGMENTS MODIFIED WITH SURFACE COUNTER-IONS

(75) Inventors: Alexey S Kabalnov, Corvallis, OR (US); Hakan Wennerstrom, Lund (SE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/043,879

(22) Filed: Mar. 6, 2008

(65) Prior Publication Data

US 2008/0152808 A1    Jun. 26, 2008

Related U.S. Application Data

(62) Division of application No. 11/043,850, filed on Jan. 25, 2005, now abandoned.

(51) Int. Cl.
 *C09D 11/00* (2006.01)
 *C04B 14/00* (2006.01)
 *B05D 5/00* (2006.01)

(52) U.S. Cl. ............ 106/31.6; 106/31.64; 106/31.65; 106/31.85; 106/400; 427/256

(58) Field of Classification Search ............ 427/256; 106/400, 31.65, 31.6, 31.64, 31.85
See application file for complete search history.

(56) References Cited

U.S. PATENT DOCUMENTS

| | | |
|---|---|---|
| 3,347,632 A | 10/1967 | Parker |
| 4,196,253 A | 4/1980 | Spence |
| 4,680,235 A | 7/1987 | Murakami et al. |
| 5,032,425 A | 7/1991 | Livsey et al. |
| 5,571,311 A | 11/1996 | Belmont et al. |
| 5,698,016 A * | 12/1997 | Adams et al. ............ 106/31.6 |
| 5,837,045 A | 11/1998 | Johnson et al. |
| 5,985,016 A * | 11/1999 | Tsang et al. ............ 106/31.64 |
| 6,034,257 A | 3/2000 | Oftring et al. |
| 6,218,067 B1 | 4/2001 | Belmont |
| 6,235,829 B1 | 5/2001 | Kwan |
| 6,494,943 B1 * | 12/2002 | Yu et al. ............ 106/31.65 |
| 6,585,818 B2 | 7/2003 | Thakkar et al. |
| 2002/0032269 A1 | 3/2002 | Schobe et al. |
| 2002/0056403 A1 | 5/2002 | Johnson et al. |
| 2003/0217672 A1 | 11/2003 | Palumbo |

FOREIGN PATENT DOCUMENTS

| | | |
|---|---|---|
| EP | 0 592 182 | 4/1994 |
| EP | 0 897 972 | 2/1999 |
| GB | 1 503 637 | 3/1978 |
| WO | WO 01/93677 | 12/2001 |

* cited by examiner

*Primary Examiner*—Anthony J Green
*Assistant Examiner*—Pegah Parvini

(57) ABSTRACT

The present invention relates to inkjet ink pigments having surface counter-ions replaced with other counter-ions with larger size and/or hydrophobicity. The effect of the replacement is to decrease pigment-ink-vehicle-separation in the inkjet ink printing process.

3 Claims, No Drawings

PIGMENTS MODIFIED WITH SURFACE COUNTER-IONS

CROSS-REFERENCE TO RELATED APPLICATIONS

This is a divisional of U.S. patent application Ser. No. 11/043,850, filed Jan. 25, 2005, now abandoned which is incorporated by reference herein in its entirety.

FIELD OF THE INVENTION

The present invention relates to inkjet ink pigments modified with counter-ions that are larger and/or more hydrophobic than the original counter ions, the modification resulting in decreased pigment-ink vehicle separation.

BACKGROUND OF THE INVENTION

There is a considerable interest in using pigments in ink jet inks. Pigments, as opposed to dyes are present in the inks in the form of particles. As a result, pigmented inks have improved edge definition for text and line art, better waterfastness and smudge-fastness and better print durability (lighffastness, ozonefastness and humidfastness), compared to dyes. The downside of pigmented inks however is that they are less reliable. Thus, pigmented inks tend to have worse idle (or decap) times, as defined below. When the ink is not printed, the pigments tend to clog the firing chamber by retracting away from the nozzle

SUMMARY OF THE INVENTION

The present invention relates to a surface-modified pigment comprising:
  an outer surface;
  ionic groups chemically grafted to the outer surface; and
  replacement counter ions bound to the ionic groups,
  wherein the replacement counter ions replace original counter ions bound to the ionic groups, the replacement counter ions being more hydrophobic and/or larger in size than the original counter ions in aqueous solution.

The present invention further relates to an ink composition comprising a liquid vehicle and a surface-modified pigment, wherein the surface-modified pigment comprises
  a pigment with an outer surface,
  ionic groups chemically grafted to the outer surface; and
  replacement counter ions bound to the ionic groups,
  wherein the replacement counter ions replace original counter ions bound to the ionic groups, the replacement counter ions being more hydrophobic and/or larger in size than the original counter ions in aqueous solution.

In addition, the present invention relates to a method of making a surface-modified pigment comprising
  a pigment with an outer surface;
  ionic groups chemically grafted to the outer surface; and
  replacement counter ions bound to the ionic groups, the replacement counter ions replacing original counter ions, the replacement counter ions being more hydrophobic and/or larger in size than the original counter ions in aqueous solution;
  the method comprising the steps of:
  converting the pigment outer surface ionic groups into acidic form by ion-exchanging with hydrogen proton as counterion;
  mixing the pigment having outer surface ionic groups in acidic form with replacement counter ions in basic form, the replacement counter ions replacing the original counter ions.

Furthermore, the present invention relates to a method of using a surface-modified pigment to decrease separation of ink vehicle and pigment particles in an inkjet printhead, the modified pigment comprising:
  a pigment with an outer surface;
  ionic groups chemically grafted to the outer surface; and
  replacement counter ions bound to the ionic groups, the replacement counter ions replacing original counter ions, the replacement counter ions being more hydrophobic and/or larger in size than the original counter ions in aqueous solution;
  the method comprising the steps of:
  converting the pigment outer surface ionic groups into acidic form by ion-exchanging with hydrogen proton as counterion;
  mixing the pigment having outer surface ionic groups in acidic form with replacement counter ions in basic form, the replacement counter ions replacing the original counter ions;
  suspending the surface-modified pigment in liquid vehicle to make ink, and
  printing the ink onto a medium with an inkjet printhead.

DETAILED DESCRIPTION OF EMBODIMENTS OF THE INVENTION

In U.S. Pat. No. 6,585,818 of Thakkar and Sun, which is herein incorporated by reference, the inventors describe ink compositions, containing a hydrophilic carbon black, organic solvents and water. As the inventors point out: "As water evaporates from the ink, the percentage of organic components in the ink formulation increases so that the ink becomes less hydrophilic. As the ink becomes less hydrophilic, the self-dispersed pigment which is strongly hydrophilic is pulled back into the bulk of aqueous phase." (U.S. Pat. No. 6,585,818, column 2, lines 7-11)

Tools are needed that can finely tune the degree of the pigment retraction in an effective and economical manner. In this application, pigment retraction will be called 'pigment-ink vehicle separation', and abbreviated as PIVS. Specifically, the need remains to finely adjust the rate of the pigment retraction.

As pigmented ink dries in an inkjet printhead, a quick pigment-ink-vehicle separation (PIVS) may take place, which results in the ink channel leading to the nozzles being substantially devoid of the colorant. While the rapid rate of PIVS is undesirable because of the idle (or decap) time being too short, the very slow rate of PIVS may be beneficial for the printhead functioning, in particular, when the printhead is stored for a prolonged time either in uncapped or in capped position.

In order to alleviate the problem of PIVS, the inkjet printers force the printhead to spit onto a special absorbing pad, or 'spittoon', on a regular basis after the period of idle time. The rate of spitting is substantially controlled by the rate of PIVS. Very frequent spits are highly undesirable, because the inks are consumed during spitting and printing is slowed down. On the other hand, PIVS is beneficial for the longer-time storage of the printhead either capped or uncapped, because it prevents the irreversible clogging of the nozzles. From the printer functionality standpoint, therefore, the best performance occurs with a system that shows very slow PIVS, on the time-scale of hours.

PIVS originates as ink sits in the ink channels and the water in the ink evaporates. As the water evaporates, pigment particles in the ink normally tend to move in the ink channel towards the nozzles unless they exhibit incompatibility with the solvent. Thus the pigment particles have two separate forces pulling them independently in different directions, one force based on the evaporation of the water in the ink and one force based on the incompatibility of the pigment particles with the solvent. This two-way movement of the pigment particles in the ink feed channel creates a colorant band, or focusing point, which results in an increased pigment concentration in the middle of the ink feed channel. Over time this colorant band or focusing point gradually moves toward the standpipe and away from the nozzle. Eventually the colorant band can be completely pushed into the standpipe or it can stop at some place in the ink channel before it reaches the standpipe.

As described above, it has been found that pigment counter-ions, bound to the ionic groups chemically grafted to the surface of the pigment, play a major role in whether PIVS occurs or not. The likely reason is because the change in the pigment counter-ions changes the salvation energy of the pigment particle as a whole. Following from this, pigments carrying the surface replacement counterions which are larger and/or more hydrophobic than the original counter-ions on the pigment surface cause less PIVS.

The present invention relates to pigments having larger and/or more hydrophobic surface cations, inks having such pigments and methods of making and using such pigments. The degree of PIVS is controlled in such pigments with counter-ions on the pigment surface that are larger and/or more hydrophobic than the original surface counterions.

In one embodiment of the present invention, counter-ions that are larger and/or more hydrophobic replace the original counter-ions that are bound to ionic groups chemically grafted to the outer surface of the pigment particles. Such chemical grafting of ionic groups can be done in several ways. Non-limiting examples of such methods include: reacting carbon black particles with a diazonium salt of aromatic carboxy- or sulfo-acid as set out in Belmont et al., U.S. Pat. No. 5,571,311; and, alternatively, introducing ionic surface groups by an oxidation reaction with sodium hypochlorite as set out in Parker, U.S. Pat. No. 3,347,632. The methods of chemical grafting described in these patents are incorporated herein by reference.

It needs to be mentioned that the size of cations in aqueous solution is in certain situations different from their atomic radius. This is the result of the effect of hydration. Therefore, lithium ion has a smaller crystallographic radius than sodium, sodium being the usual first counter-ion of the pigment surface before it is modified according to the present invention. However, lithium-containing inorganic salts have smaller diffusivity in water and smaller electrical conductivity in water than the corresponding sodium salts, two characteristics that are found in counterions which are actually larger in size (in terms of their atomic radius) than sodium, such as $K^+$, $NH_4^+$, $N(CH_3)_4^+$(tetramethyl amine)(TMA), $N(C_2H_5)_4^+$(tetraethyl amine)(TEA), $N(C_3H_7)_4^+$(tetrapropyl amine)(TPA), and $N(C_4H_9)_4^+$(tetrabutyl amine) (TBA). The above two conductivity characteristics make lithium ions, like the other counter ions above, larger than sodium ion when each of the ions are hydrated.

As non-limiting examples of such larger and/or more hydrophobic replacement counter-ions on the pigment particles, the counter-ions can include hydrophobic cations, non-sodium alkali metal cations, or mixtures thereof. For example, replacement counter-ions can include such groups as quaternary amines, phosphines or arsines. As a further non-limiting example, the replacement counter-ions can include: $Li^+$, $K^+$, $NH_4^+$, $N(CH_3)_4^+$(TMA), $N(C_2H_5)_4^+$(TEA), $N(C_3H_7)_4^+$(TPA), and $N(C_4H_9)_4^+$(TBA).

In another embodiment of the present invention, a mixture of two or more kinds of counter-ions that are larger and/or more hydrophobic replaces the original counter-ions on the pigment particles. As a non-limiting example, such replacement counter-ions on the pigment particles can include a combination of hydrophobic cations and non-sodium alkali metal cations. For example, such a combination can include such groups as quaternary amines, phosphines or arsines. As a further non-limiting example, the replacement counter-ions can include a combination of at least two of the following: $Li^+$, $Na^+$, $K^+$, $NH_4^+$, $N(CH_3)_4^+$(TMA), $N(C_2H_5)_4^+$(TEA), $N(C_3H_7)_4^+$(TPA), $N(C_4H_9)_4^+$(TBA) and combinations thereof. In the examples below, the chemical modification is conducted on anionic pigments, that is, on pigments having anionic groups grafted to their surface with cations as counter-ions. However, an alternative implementation is also possible, with cationic groups grafted to the surface of the pigment and anions as counter-ions. For anions to be used as counter ions, one could use e.g., alkyl sulfates of variable alkyl chain length (methylsulfate, ethylsulfate, propylsulfate, etc). In the case of both cations and anions used as counter-ions, proper adjustment of the hydrophobicity of the counter-ion can be made by the selection of the right alkyl length.

A non-limiting example of the method of making pigments having counter-ions with larger and/or more hydrophobic cations is as follows. A self-dispersed anionically-modified pigment is converted into acidic form by using an ion exchange resin, and then ion-exchanged by a base, or a mixture of bases, where the cation of the base is the one that is going to be introduced on the pigment.

In the examples below, the experimentation was conducted with the LEG-1 solvent (Liponics), which is a polyethoxylated ether of glycerol. The scope of the invention is however not limited to this solvent and other ink-jet solvents can be used, such as oligo-ethyleneglycols, alkylglycols, 2-pyrrolidone, etc.

EXAMPLES

Example 1

Ink Preparation

Commercial carbon black pigment CaboJet 200 (Cabot) was used as the basis for the experiments. The pigment contains d~110 nm pigment particles of carbon black, with phenylsulfonic groups chemically attached to the surface. The pigment is supplied as a 20 wt % solution, with sodium ion as the counter-ion.

In order to prepare different ionic forms of the pigment, the stock solution was ion-exchanged into the sulfo-acid form by mixing 200 g 20% aqueous pigment stock with 7 g of Dowex-5W ionite in acid form overnight with filtration. The procedure was repeated 4 times to ensure completeness of the exchange. For each of the inks, the acid form was then converted into pH-neutral form by ion-exchange using at least one of the bases: lithium, potassium, ammonium, tetramethylammonium, tetraethylammonium, tetrapropylammonium, and tetrabutylammonium hydroxides. The final inks were formulated at two different pigment loadings: 4% and 0.1% (Table 1). All the inks were formulated with the same solvent, LEG-1 (Liponics), which was present at 10 wt %. The solvent represents a polyethoxylated ether of glycerol.

Table 2 below demonstrates the degree of conversion of the sodium form of the pigment to the other ionic forms. Table 3 lists the pH and conductivities of some of the final inks.

TABLE 1

Compositions of inks studied

| Ink name | Pigment | LEG-1 | Water |
|---|---|---|---|
| $Na^+$ 4% | 4% | 10% | balance |
| $K^+$ 4% | 4% | 10% | balance |
| $Li^+$ 4% | 4% | 10% | balance |
| $NH_4^+$ 4% | 4% | 10% | balance |
| TMA 4% | 4% | 10% | balance |
| TEA 4% | 4% | 10% | balance |
| TPA 4% | 4% | 10% | balance |
| TBA 0.1% | 4% | 10% | balance |
| $Na^+$ 0.1% | 0.1% | 10% | balance |
| $K^+$ 0.1% | 0.1% | 10% | balance |
| $Li^+$ 0.1% | 0.1% | 10%, | balance |
| $NH_4^+$ 0.1% | 0.1% | 10% | balance |
| TMA 0.1% | 0.1% | 10% | balance |
| TEA 0.1%. | 0.1% | 10% | balance |
| TPA 0.1% | 0.1% | 10% | balance |
| TBA 0.1% | 0.1% | 10% | balance |

TABLE 2

Elemental composition of the inks, containing 4 wt % of CaboJet pigments in different ionic forms

| Sample ID: | $K^+$, mmol/L | $Li^+$, mmol/L | $Na^+$, mmol/L | $Na^+$ impurities, % |
|---|---|---|---|---|
| $Li^+$ form | 0.6 | 32.9 | 2.0 | 5.75% |
| $K^+$ form | 31.8 | | 2.3 | 6.64% |
| $NH_4^+$ form | 0.6 | | 1.9 | |
| TMA form | 0.5 | | 1.7 | |
| TEA form | 0.7 | | 1.8 | |
| TPA form | 0.5 | | 1.8 | |
| TBA form | 0.5 | | 1.8 | |

TABLE 3 pH and conductivity of the inks, containing 4 wt % of CaboJet pigments in different ionic forms, and 10% LEG-1

| Counter-ion | pH of 4 wt % ink | Conductivity of 4 wt % ink, µS/cm |
|---|---|---|
| $Li^+$ | 6.28 | 821 |
| $Na^+$ | 6.88 | 946 |
| $K^+$ | 5.9 | 1161 |
| $NH_4^+$ | 6.97 | 1215 |
| TMA | 7.6 | 871 |
| TEA | 7.52 | 752 |
| TPA | 9.46 | 628 |
| TBA | 6.81 | 540 |

Example 2

Observation of Pigment Retraction from the Nozzles (PIVS)

The inks were filled into empty printheads similar to HP hpc4812a which have a transparent orifice plate, so that the pigment retraction could be monitored by looking through the orifice plate. PIVS measurements were done by using a Nikon microscope equipped with a digital camera and taped on a regular VCR. The 'time zero' moment was set by doing a wipe of a printhead with a dry blotter. The experiments were made at ambient humidity, which was 30-60%. For each system, the time of PIVS was defined as the time needed for the pigment front to cross the middle of circular islands in the end of the ink feed channel from the moment of the wipe. The time of PIVS showed a surprisingly good reproducibility despite the variations in external relative humidity, with the typical scatter of about 10%.

In Table 4, it can be clearly seen that there is a strong counter-ion dependence of PIVS. The following counter-ion sequence of PIVS was observed with the rate decreasing from left to right: TMA>$Na^+$~$NH_4^+$>$Li^+$>>TPA>>TBA. Thus, at 4% pigment loading, for TMA, the rate of PIVS was about 3.5 minutes. It took twice as much for TEA, and about ×10-100 longer for TPA. For the 4% dispersion, the TBA form showed a negligibly slow rate of PIVS. By combining these counterions in a blend, the range of PINS timescale would be covered, from minutes to hours, as demonstrated by the last example of Table 4. The concentration of pigment also affects the rate of PIVS: at higher pigment concentration, the rate was slower, although the order of cation effect was conserved.

TABLE 4

Time of PIVS as the function of the counter-ion nature

| Ion | Time of PIVS, minutes 0.1% pigment load | Time of PVIS, 4% pigment load |
|---|---|---|
| $Li^+$ | 3.9 | 9.5 |
| $Na^+$ | 2.4 | 4.6 |
| $K^+$ | 2.8 | 4.8 |
| $NH_4^+$ | 2.9 | 6.1 |
| TMA | 2.3 | 3.5 |
| TEA | 3.3 | 6.6 |
| TEA-TPA 1:1 mixture | 4.4 | No data |
| TPA | 7.4 | No PIVS |
| TBA | 60.0 | No PIVS |

While several embodiments have been described in detail, it will be apparent to those skilled in the art that the disclosed embodiments may be modified. Therefore, the foregoing description is to be considered exemplary rather than limiting.

What is claimed is:

1. An ink composition, comprising:
    a liquid vehicle; and
    a surface-modified pigment, wherein the surface-modified pigment includes:
        a pigment with an outer surface;
        anionic groups chemically grafted to the outer surface; and
        replacement cationic counter ions bound to the anionic groups, the replacement cationic counter ions being selected from the group consisting of $N(C_2H_5)_4^+$, $N(C_3H_7)_4^+$, $N(C_4H_9)_4^+$, and combinations thereof;
    wherein the replacement cationic counter ions replace original cationic counter ions bound to the anionic groups, the replacement counter ions being larger in size, more hydrophobic, or both larger in size and more hydrophobic than the original counter ions in aqueous solution;
    and wherein the replacement cationic counter ions are configured to decrease separation of the pigment from the liquid vehicle in an inkjet printhead.

2. A method of making a surface-modified pigment, comprising:
    chemically grafting anionic groups to an outer surface of a pigment; and binding replacement cationic counter ions to the anionic groups, the replacement cationic counter ions being selected from the group consisting of $N(C_2H_5)_4^+$, $N(C_3H_7)_4^+$, $N(C_4H_9)_4^+$, and combinations thereof, the replacement cationic counter ions replacing original cationic counter ions bound to the anionic groups, thereby forming the surface-modified pigment, the replacement counter ions being larger in size, more hydrophobic, or both larger in size and more hydrophobic than the original counter ions in aqueous solution, and the replacement cationic counter ions configured to decrease separation of the pigment from a liquid vehicle of an ink composition incorporating the surface-modified pigment in an inkjet printhead, the binding having been accomplished by:

converting the pigment outer surface anionic groups into acidic form by ion-exchanging with hydrogen proton as counterion; and mixing the pigment having outer surface anionic groups in acidic form with replacement cationic counter ions in basic form, the replacement cationic counter ions replacing the original cationic counter ions.

3. A method of using a surface-modified pigment, comprising:

chemically grafting anionic groups to an outer surface of a pigment;

binding replacement cationic counter ions to the anionic groups, the replacement cationic counter ions being selected from the group consisting of $N(C_2H_5)_4^+$, $N(C_3H_7)_4^+$, $N(C_4H_9)_4^+$, and combinations thereof, the replacement cationic counter ions replacing original cationic counter ions bound to the anionic groups, thereby forming the surface-modified pigment, the replacement counter ions being larger in size, more hydrophobic, or both larger in size and more hydrophobic than the original counter ions in aqueous solution, the binding having been accomplished by:

converting the pigment outer surface anionic groups into acidic form by ion-exchanging with hydrogen proton as counterion; and mixing the pigment having outer surface anionic groups in acidic form with the replacement cationic counter ions, the replacement cationic counter ions being in basic form and replacing the original cationic counter ions;

suspending the surface-modified pigment in a liquid vehicle to make an ink composition with decreased separation of the pigment from the liquid vehicle in an inkjet printhead; and printing the ink composition onto a medium with the inkjet printhead.

* * * * *